(12) United States Patent
Albright et al.

(10) Patent No.: US 7,361,693 B2
(45) Date of Patent: *Apr. 22, 2008

(54) LOW DENSITY POLYMER BEADS

(75) Inventors: Robert L. Albright, Southampton, PA (US); Richard Mapp, Belle Chasse, LA (US)

(73) Assignee: Sun Drilling Products Corporation, Belle Chase, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/183,480

(22) Filed: Jul. 18, 2005

(65) Prior Publication Data

US 2005/0250865 A1    Nov. 10, 2005

Related U.S. Application Data

(63) Continuation of application No. 10/452,416, filed on May 30, 2003, now Pat. No. 6,930,133.

(60) Provisional application No. 60/385,228, filed on May 31, 2002, provisional application No. 60/391,334, filed on Jun. 25, 2002, provisional application No. 60/401,538, filed on Aug. 7, 2002.

(51) Int. Cl.
    *C08J 9/26* (2006.01)

(52) U.S. Cl. ............................ 521/51; 521/61; 521/64; 521/134; 521/142; 521/144; 521/149; 526/304; 526/307; 526/319; 526/321

(58) Field of Classification Search .................. 521/29, 521/51, 61, 64, 149, 143, 142, 144, 14; 526/304, 526/307, 319, 321, 32

See application file for complete search history.

(56) References Cited

U.S. PATENT DOCUMENTS

| | | | |
|---|---|---|---|
| 3,663,467 A * | 5/1972 | Albright | ..................... 427/146 |
| 3,857,824 A | 12/1974 | Atkins | |
| 4,940,734 A | 7/1990 | Ley et al. | |
| 5,047,437 A | 9/1991 | Cooke et al. | |
| 5,314,923 A | 5/1994 | Cooke et al. | |
| 5,714,237 A | 2/1998 | Cooprider et al. | |
| 5,872,198 A | 2/1999 | Mosbach et al. | |
| 6,138,834 A | 10/2000 | Southall | |
| 6,423,666 B1 | 7/2002 | Liao | |
| 6,525,170 B1 | 2/2003 | Wang | |
| 6,530,437 B2 | 3/2003 | Maurer et al. | |

* cited by examiner

*Primary Examiner*—Irina S Zemel
(74) *Attorney, Agent, or Firm*—Morgan, Lewis & Bockius LLP

(57) ABSTRACT

Low density polymeric beads made by polymerizing monomeric building blocks into large crosslinked polymer molecules in porous, spherical bead form by droplet or suspension polymerization in the presence of a porogen.

8 Claims, 4 Drawing Sheets

LOW DENSITY POLYMER BEADS

REFERENCE TO RELATED APPLICATIONS

This application is a continuation of U.S. application Ser. No. 10/452,416 filed on May 30, 2003, now U.S. Pat. No. 6,930,133, which application claims the benefit of U.S. Provisional Application No. 60/385,228 filed on May 31, 2002, entitled "Low Density Polymeric Beads," U.S. Provisional Application No. 60/391,334 filed on Jun. 25, 2002, entitled "Low Density Polymeric Beads for Application in Concrete in General Construction," and U.S. Provisional Application No. 60/401,538 filed on Aug. 7, 2002, entitled "Use of Low Density Polymeric Beads to Reduce Hydrostatic Pressure of Fluid Column."

FIELD OF INVENTION

The invention relates to low density polymer beads for regulating the density of fluids and solids.

BACKGROUND OF INVENTION

During the drilling and completion of oil and gas wells, it may be useful to lighten columns of fluid in order to control better the pressures associated with large columns of fluid, including drilling mud and other slurries, such as cement, which is used to set casing strings during the drilling and completion process. By mixing low density articles with these fluids, the weight of the column is reduced in order to achieve desirable engineering goals associated with the drilling and completion process. These goals may include improving down hole pressure and fluid loss control, extending depths to which casing strings may be set, lowering well costs, and obtaining other benefits without adverse effects.

Low density articles may also be useful in providing buoyancy and thermal insulation associated with, for example, the installation of deep water pipelines. By mixing the low density articles with certain foams or other media used to fill the annulus between a pipeline and an outer casing, buoyancy may be provided, which often has desirable engineering benefits associated with laying the pipeline in great depths of water. Low density articles may also provide an enhanced insulation effect against temperature extremes inside and outside the pipeline casing.

SUMMARY OF THE INVENTION

Low density polymer beads for admixture with fluids are prepared by polymerizing monomeric building blocks into large crosslinked polymer molecules in porous, spherical bead form by droplet or suspension polymerization in the presence of a porogen. The porogen promotes the development of the pore structure by precipitating the growing polymer molecules into amorphous solid particles. Several types of porous polymer bead structures have been developed. In one embodiment, the porous polymer bead structure is an open cell pore system comprised of discrete microgel polymer particles glued together at their tangential faces with an invaginated porous skin. The porous core provides both a continuous polymer and continuous pore phase. In another embodiment, the porous polymer bead structure has a porous core packed with macrogel particles unattached to each other and contained by a peripheral skin that is smooth and non-porous. The pore system provides a discontinuous polymer phase, but a continuous pore phase.

The low density polymer bead systems are formed in a single-step polymerization process by varying the concentration of a hydrophobic porogen in the presence of a hydrophilic crosslinker, a hydrophobic crosslinker, and one or more hydrophobic monovinyl monomers. Specific gravities of about 0.2 to about 0.9 for the porous polymer beads are achieved by this synthesis procedure.

BRIEF DESCRIPTION OF THE DRAWINGS

The accompanying drawings, which are incorporated herein and constitute a part of this specification, illustrate the presently preferred embodiments of the invention and, together with the general description given above and the detailed description given below, serve to explain the features of the invention.

In the drawings.

DETAILED DESCRIPTION OF THE INVENTION

Figure 1:
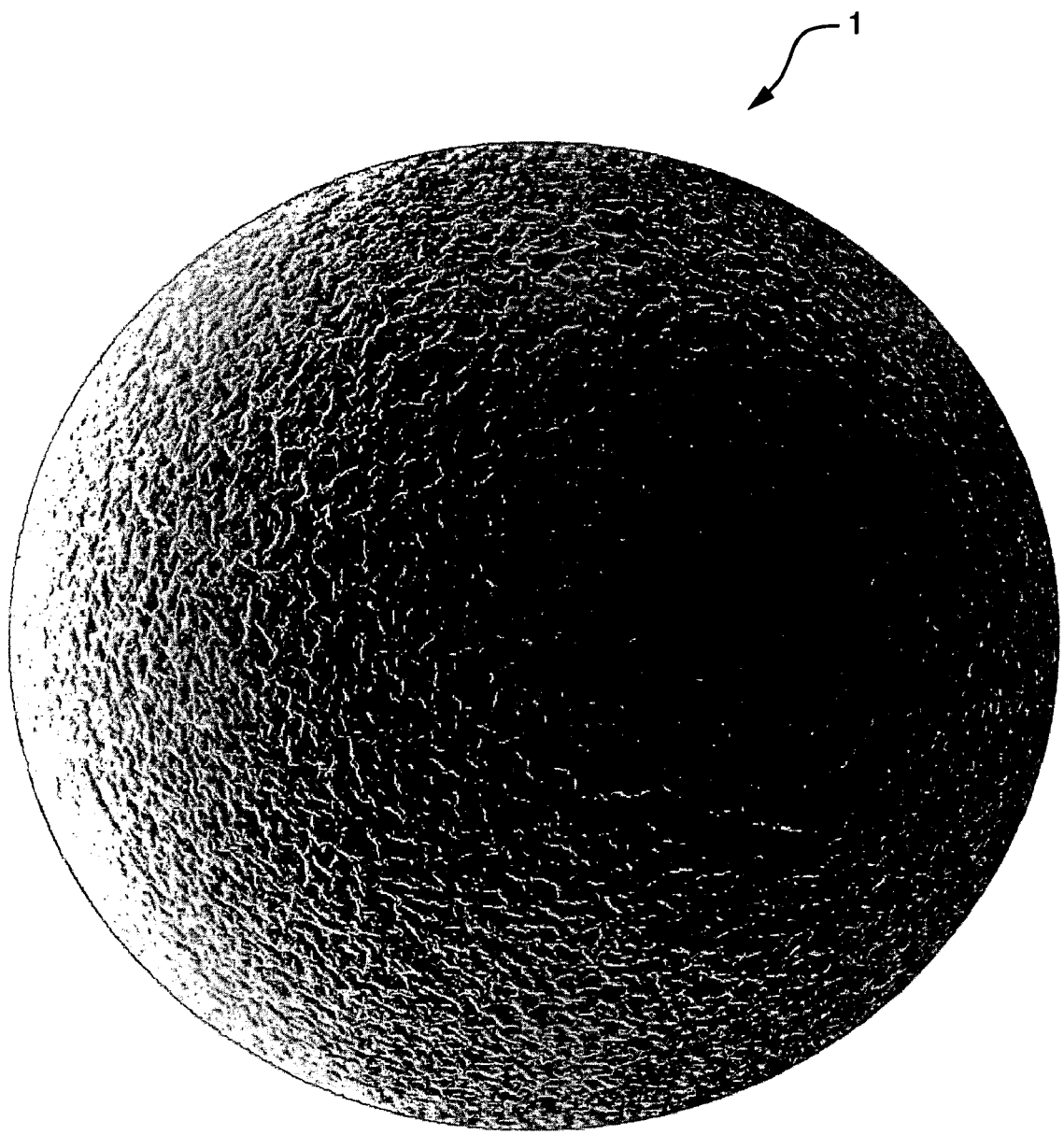
FIG. 1 is a perspective view of one embodiment of the invention.

In accordance with the present invention, the polymer beads have a low specific gravity and high strength for applications that require lowering the specific gravity or density of a fluid. Low density (low specific gravity) polymer beads are made by polymerizing monomeric building blocks into large crosslinked polymer molecules in porous, spherical bead form via droplet or suspension polymerization in the presence of a hydrophobic porogen, which develops the pore structure by precipitating the growing polymer molecules from the porogen-monomer liquid. This single-step polymerization process allows pores to form within the beads, while simultaneously coating the beads. A hydrophobic and a hydrophilic crosslinker are used simultaneously with a hydrophobic porogen in the polymerization to develop the porous core with a peripheral skin. The structure of the internal pore system and the nature of the peripheral skin are controlled by varying the concentration of the hydrophobic porogen and the concentration of the hydrophilic crosslinker.

The hydrophilic crosslinker may be any one of a number of hydrophilic polyvinyl monmers and the hydrophobic crosslinker may be an one of a number of hydrophobic polyvinyl monomers. Preferably, the hydrophilic crosslinker is trimethylolpropane trimethacrylate (TMPTMA), trimethylolpropane dimethacrylate, trimethylolpropane triacrylate, trimethyolpropane diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol dimethacrylate, dipentaerythritol trimethacrylate, dipentaerythritol tetramethacrylate, dipentaerythritol pentamethacrylate, pentaerythritol trimethacrylate, and/or pentaerythritol tetramethacrylate. The hydrophobic crosslinker is divinylbenzene (DVB), trivinylbenzene, divinylnapthalene, and/or trivinylcyclohexane The level of crosslinker may be varied from about one percent (1%) to about fifty percent (50%). The level of hydrophilic crosslinker may be varied from five percent (5%) to about fifty percent (50%). The strength of the beads may be adjusted by varying the concentration of this hydrophilic crosslinker. The remaining monomer may be one or more hydrophobic monovinyl monomers. Preferably, the hydrophobic monovinyl monomer is styrene, ethylvinylbenzene (EVB), vinyltoluene, and/or vinylnaphthalene.

The porogens are hydrophobic hydrocarbon molecules varying from pentanes to large saturated hydrocarbon molecules having thirty carbon atoms. The hydrocarbon molecules may be branched, cyclic, bicyclic, and tricyclic.

Initiators are added to the process to initiate the polymerization reaction. These free radical initiators may include peroxyesters, diacyl peroxides, diakyl peroxides, peroxydicarbonates, and/or azobis (α-cyanoalkanes). For example, benzoyl peroxide may be used as an initiator within a temperature range of about 65° C. to about 75° C. and 2,2'-azobis(2,4-dimethylpentane nitrile) may be used as an initiator within a temperature range of about 52° C. to about 55° C. However, any available free radical initiator may be used and the choice of inhibitor may be temperature dependent.

When the low specific gravity beads are added to drilling fluids or cements, the density of the fluid is reduced. The density p of the fluid with the beads is:

$$p = \frac{(100-v)p_f + vp_s}{100}$$

wherein $p_f$ is the fluid density without the beads (g/ml);

$p_s$ is the density of the beads (g/ml of beads); and v is the concentration of the beads (weight %).

A low specific gravity is achieved by developing holes or pores within the spherical polymer beads while the polymer is growing from the monomeric units. Specific gravities from about 0.2 to about 0.9 are able to be achieved for the polymer beads. Preferably, the specific gravities of the beads range from about 0.25 to about 0.6. The specific gravity may be manipulated by varying the concentration of the hydrophobic porogen. These beads may be between about 100 and about 350 microns in size and are spherical (i.e., substantially spherical or spheroid) in shape.

The porous, spherical bead may comprise about 50-60 weight % monomers and 40-50 weight % hydrophobic porogen of the organic phase. The monomers, or reactants, may comprise about 5-15 weight % divinylbenzene, 5-25 weight % TMPTMA, and about 60-90 weight % mixture of styrene and ethylvinylbenzene. In a first embodiment, the reactants comprise about 52 weight % and the hydrophobic porogen comprises about 48 weight % of the organic phase. The hydrophobic porogen may also comprise a minimal amount of less than about one (1) weight % of inerts. Preferably, the hydrophobic porogen is isooctane. In one aspect of the invention, the reactants comprise about 10 weight % divinylbenzene, about 77.2 weight % styrene, about 7.8 weight % ethylvinylbenzene, and about 5 weight % TMPTMA. With these compositions, open cell beads with a thin, porous invaginated peripheral film having an internal domain of randomly packed small spherical microgel particles glued together into clusters are formed. These beads have a continuous pore phase, a continuous polymer phase and a hydrophobic internal pore surface, which does not wet out with water or aqueous liquids.

Figure 2:
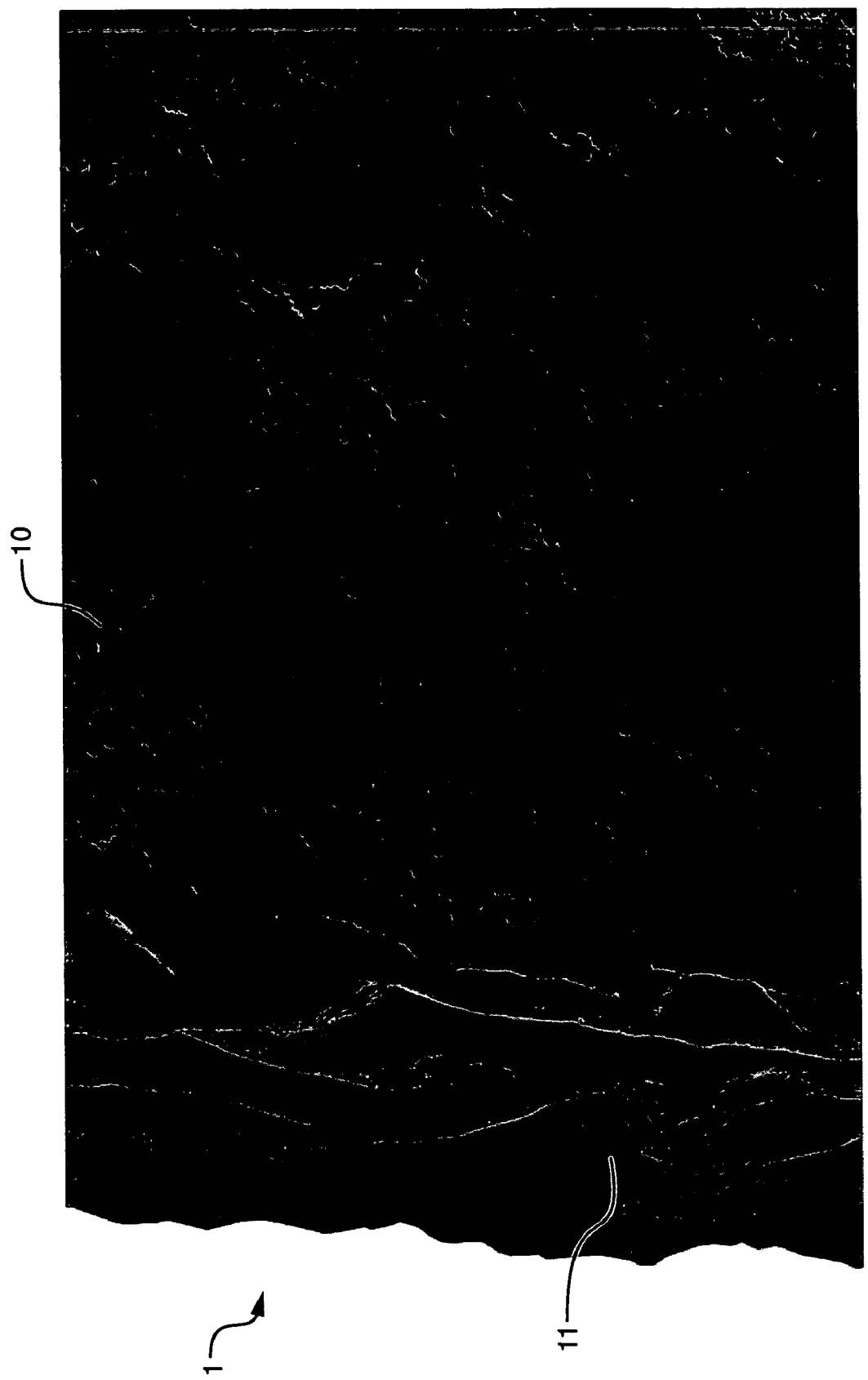
FIG. 2 is a sectional view of the embodiment of FIG. 1.

An example of an open cell bead is shown in FIGS. 1 and 2. These beads may be made with varying porosities to give specific gravities ranging from about 0.2 to about 0.9, and preferably, about 0.25 to about 0.6, and are designed for admixture to cement slurries to reduce the specific gravity of a cement. As shown in FIGS. 1 and 2, the open cell bead 1 has a porous core 10 with an invaginated skin, or coating, 11. The thickness of the invaginated skin may range from 0.1 to 0.5 microns, but is generally thinner than impenetrable skin of a bead. The open cell beads may withstand pressures, or have a crush resistance, up to 1500 psig and withstand temperatures up to 400° F.

In a second embodiment, the reactants comprise about 50 weight % and the hydrophobic porogen comprises about 50 weight % of the organic phase. Preferably, the hydrophobic porogen is isooctane. Preferably, the reactants comprise about 8 weight % divinylbenzene, about 70.7 weight % styrene, about 6.3 weight % ethylvinylbenzene, and about 15 weight % TMPTMA in the presence of about 50 weight % isooctane (of the organic phase). With these compositions, porous beads with a thick, smooth, continuous peripheral film having an internal domain packed with large ovoid macrogel particles shaped as ovoids and unattached to each other are formed.

Figure 3:
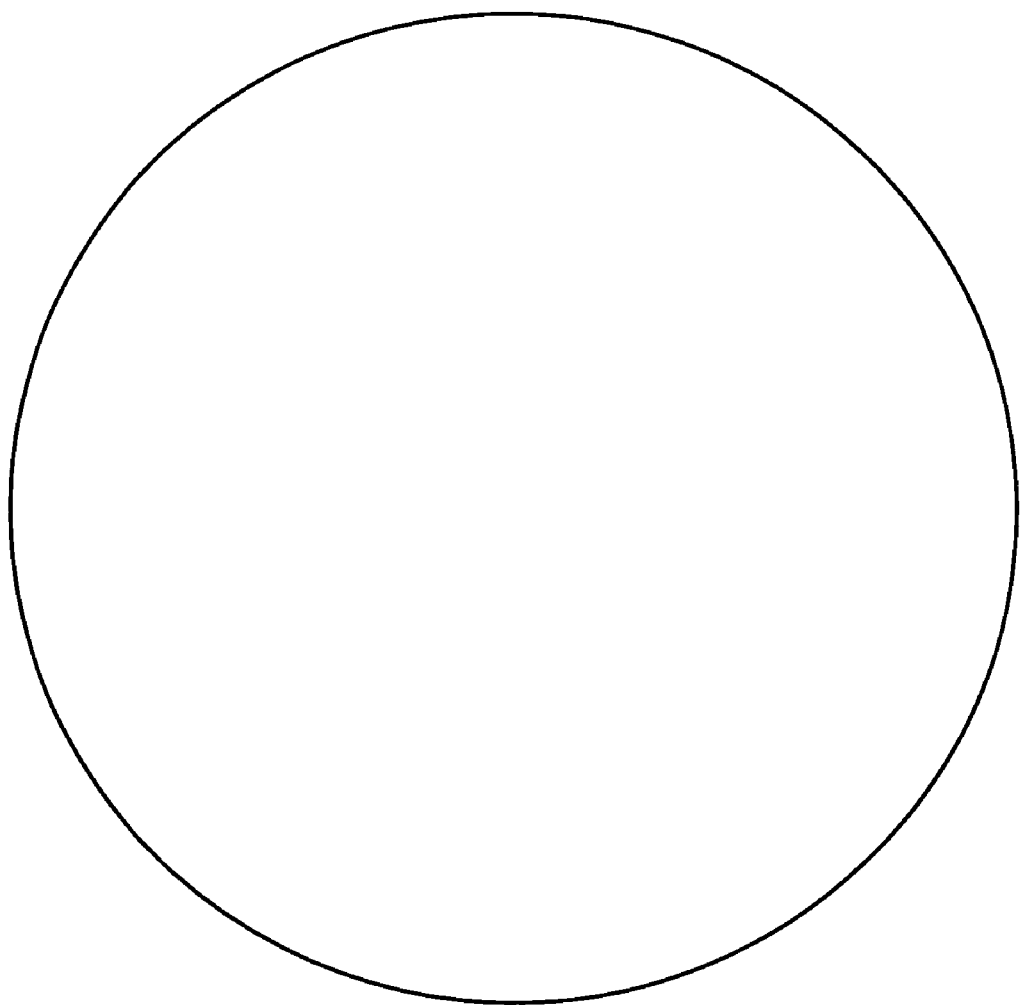
FIG. 3 is a perspective view of another embodiment of the invention.
Figure 3:
Figure 4:
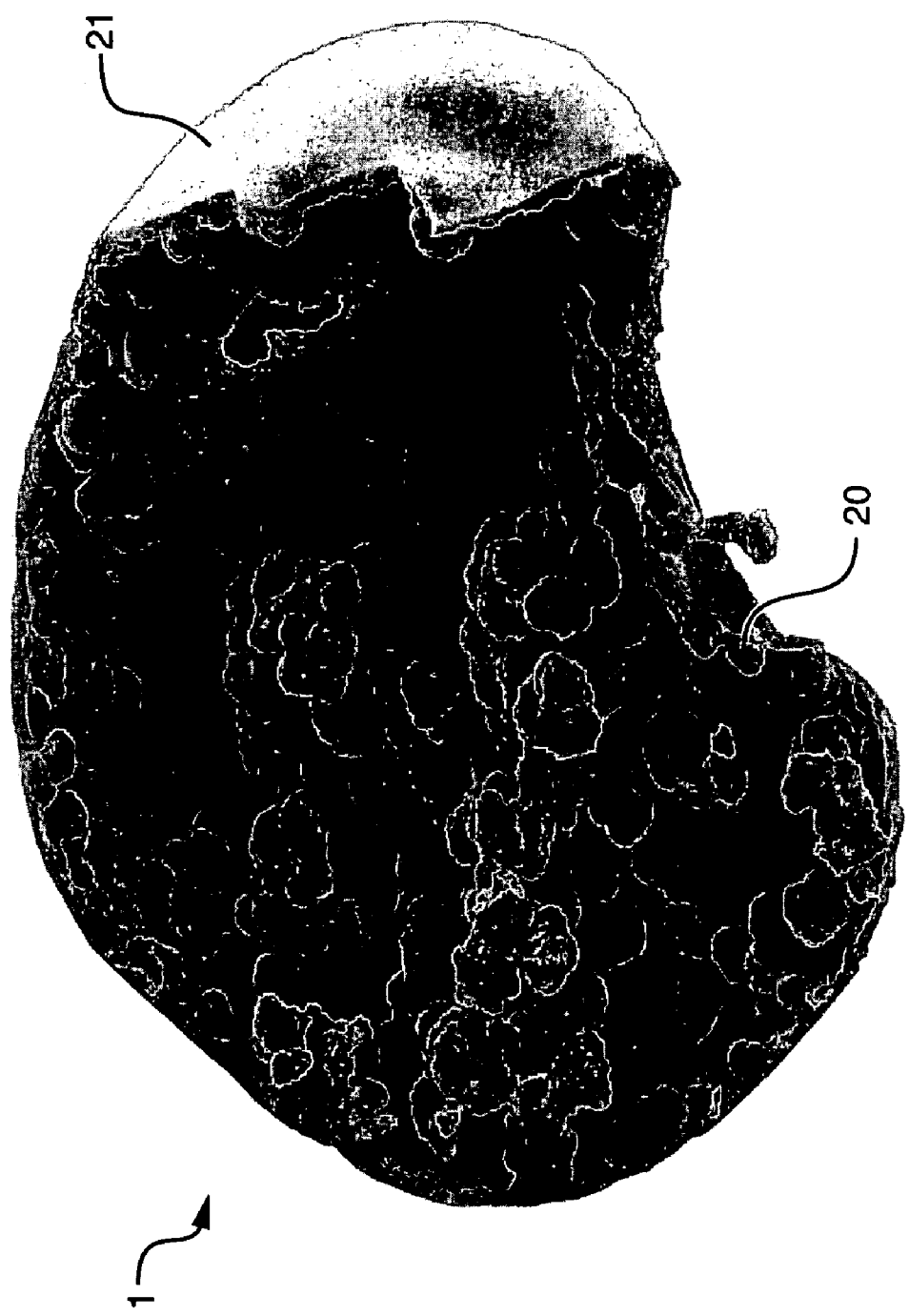
FIG. 4 is a sectional view of the embodiment of FIG. 3.

An example of a porous bead with impenetrable skin is shown in FIGS. 3 and 4. The internal polymer phase, therefore, is discontinuous, but the pore phase is continuous. These low density porous beads are impenetrable by both water (or any other aqueous media) and petroleum hydrocarbons because of the thickness and continuity of the peripheral film. The porosity of these beads may be regulated by the synthesis to give specific gravities ranging from about 0.2 to about 0.9, and preferably, about 0.25 to about 0.6. As shown in FIGS. 3 and 4, the porous bead with impenetrable skin 2 has a porous core 20 with a smooth, non-porous skin, or coating, 21. The thickness of the impenetrable skin may range from about 5 to 10 microns, but is generally thicker than the skin of an open cell bead. The bead with impenetrable skin may withstand temperatures up to 400° F.

The following examples describe the method of synthesis of the embodiments of the invention. These examples are illustrative of the invention and are not intended to be construed as limitations to the invention. Although two embodiments are discussed above and below, there are many other embodiments that fall within the scope of the invention.

Example 1 describes the method of synthesis of the first embodiment and Example 2 describes the method of synthesis of the second embodiment. The beads of both Examples 1 and 2 were prepared in spherical geometric form by suspension (droplet) polymerization of an organic liquid dispersed via agitation in a formulated aqueous phase to maintain droplet stability. The agitation rate was regulated to give the desired particle size distribution. The aqueous phase was formulated with a polymeric dispersant, a protective colloid, an aqueous phase free radical inhibitor, and a buffering agent to keep the pH above 7.5. The aqueous phase composition was as follows:

| | |
|---|---|
| water | 99.00 weight %; |
| Natrosol ® Plus, grade 330 | 0.10 weight %; |
| gelatin | 0.30 weight %; and |
| NaHCO$_3$ | 0.30 weight %. |

More specifically, the beads were made by first preparing an aqueous phase by adding a nonionic cellulose derivative, or Natrosol® Plus, grade 330 available from Hercules, for example, to cold water in a reactor. The Natrosol® was added slowly so that it evenly dispersed in the water. If Natrosol® is added rapidly, it may form clumps that do not dissolve. The aqueous phase was then heated to about 50° to 60° C. with agitation. When the Natrosol® dissolved, gelatin, sodium nitrite, and sodium bicarbonate were added. The mixture was stirred until all of the solids were dissolved. At this point, the aqueous phase had a pH between about 8.5 and 9.5. The temperature was set to 52° C., the agitation rate was kept low to minimize foaming, and the system was purged with nitrogen.

The monomer phase was prepared by adding divinylbenzene, TMPTMA, styrene and isooctane to a reactor, or tank. The mixture was stirred and an initiator, such as azobis (α-cyanoalkane), was added. The initiator dissolved rapidly.

The monomer phase was then added to the aqueous phase at 52° C. with the required agitation rate and nitrogen purge. The agitation rate was increased from the low agitation rate employed during heating of the aqueous phase. The temperature may drop because the monomer phase is at or below ambient temperature. However, the temperature should be kept at 52° C. for about twenty hours. After the twenty hours, the slurry was heated to about 75° C. for about two hours and then cooled.

The bead slurry was poured onto a screen with a 100 micron sieve opening and washed on the screen with a quantity of water about five times the volume of the reactor, followed by washing with a quantity of deionized water about four times the volume of the reactor. The final effluent should be clear except for the polymer beads washed through the screen. The beads were dried to remove any isooctane or water. Some beads were air dried to remove water and all beads were dried in a vacuum to remove isooctane. The aqueous phase contained some fine amorphous polymer that was be removed when washed on a screen.

The following experimental results were obtained for Examples 1 and 2.

EXAMPLE 1

| Run Number | DVB Wt. % | Sty + EVB Wt. | % TMPTMA | Initiator Type | Initiator Wt. % | Isooctane Wt. % | Screen Size or median diameter | Spec Grav |
|---|---|---|---|---|---|---|---|---|
| 55 | 10.0 | 90.0 | — | BPO | 1.50 | 40.0 | 16 × 40 | 0.61 |
| 56 | 10.0 | 90.0 | — | BPO | 1.50 | 50.0 | 16 × 40 | 0.33 |
| 57 | 10.0 | 85.0 | 5.0 | BPO | 1.50 | 40.0 | 16 × 40 | 0.56 |
| 58 | 10.0 | 85.0 | 5.0 | BPO | 1.54 | 45.0 | 20 × 50 | 0.48 |
| 59 | 10.0 | 85.0 | 5.0 | BPO | 1.50 | 38.0 | 16 × 40 | 0.60 |
| 60 | 10.0 | 85.0 | 5.0 | V65 | 1.54 | 38.0 | 16 × 40 | 0.58 |
| 61 | 10.0 | 85.0 | 5.0 | V65 | 1.54 | 45.0 | 10 × 40 | 0.47 |
| 62B1 | 10.0 | 85.0 | 5.0 | V65 | 1.54 | 48.0 | 10 × 40 | 0.40 |
| 62B2 | 10.0 | 85.0 | 5.0 | V65 | 1.54 | 48.0 | 320 μm | 0.39 |
| 62B3 | 10.0 | 85.0 | 5.0 | V65 | 1.54 | 48.0 | 260 μm | 0.41 |
| 62B4 | 10.0 | 85.0 | 5.0 | V65 | 1.54 | 48.0 | 108 μm | 0.34 |
| 62B5 | 10.0 | 85.0 | 5.0 | V65 | 1.54 | 48.0 | 130 μm | 0.30 |
| 62B6 | 10.0 | 85.0 | 5.0 | V65 | 1.54 | 48.0 | 162 μm | 0.39 |
| 62B7 | 10.0 | 85.0 | 5.0 | V65 | 1.54 | 48.0 | 173 μm | 0.33 |
| 62B8 | 10.0 | 85.0 | 5.0 | V65 | 1.54 | 48.0 | 257 μm | 0.42 |
| 62B9 | 10.0 | 85.0 | 5.0 | V65 | 1.54 | 48.0 | 232 μm | 0.42 |
| 62B10 | 10.0 | 85.0 | 5.0 | V65 | 1.54 | 48.0 | 443 μm | 0.40 |
| 62B11 | 10.0 | 85.0 | 5.0 | V65 | 1.54 | 48.0 | 366 μm | 0.41 |
| 62B12 | 10.0 | 85.0 | 5.0 | V65 | 1.54 | 48.0 | 323 μm | 0.40 |
| 62B13 | 10.0 | 85.0 | 5.0 | V65 | 1.54 | 48.0 | 323 μm | 0.40 |
| 62B14 | 10.0 | 85.0 | 5.0 | V65 | 1.54 | 48.0 | 173 μm | 0.38 |
| 66 | 10.0 | 80.0 | 10.0 | V65 | 1.54 | 48.0 | 121 μm | 0.40 |
| 67 | 10.0 | 75.0 | 15.0 | V65 | 1.54 | 48.0 | 152 μm | 0.31 |
| 68 | 12.0 | 78.0 | 10.0 | V65 | 1.54 | 48.0 | 166 μm | 0.43 |
| 69 | 12.0 | 73.0 | 15.0 | V65 | 1.54 | 48.0 | 202 μm | 0.40 |

EXAMPLE 2

| Run Number | DVB Wt. % | Sty + EVB Wt. % | TMPTMA Wt. % | Initiator Type | Initiator Wt. % | Isooctane Wt. % | Screen Size or median diameter | Spec Grav |
|---|---|---|---|---|---|---|---|---|
| 56 | 10.0 | 90.0 | — | BPO | 1.50 | 50.0 | 16 × 40 mesh | 0.33 |
| 63 | 10.0 | 85.0 | 5.0 | V65 | 1.54 | 50.0 | 435 μm | 0.36 |
| 64 | 8.0 | 82.0 | 10.0 | V65 | 1.54 | 50.0 | 202 μm | 0.46 |

-continued

| Run Number | DVB Wt. % | Sty + EVB Wt. % | TMPTMA Wt. % | Initiator Type | Initiator Wt. % | Isooctane Wt. % | Screen Size or median diameter | Spec Grav |
|---|---|---|---|---|---|---|---|---|
| 65B1 | 8.0 | 77.0 | 15.0 | V65 | 1.54 | 50.0 | 183 μm | 0.42 |
| 65B2 | 8.0 | 77.0 | 15.0 | V65 | 1.54 | 50.0 | 180 μm | 0.36 |
| 65B3 | 8.0 | 77.0 | 15.0 | V65 | 1.54 | 50.0 | 176 μm | 0.36 |
| 65B4 | 8.0 | 77.0 | 15.0 | V65 | 1.54 | 50.0 | 195 μm | 0.38 |
| 65B5 | 8.0 | 77.0 | 15.0 | V65 | 1.54 | 50.0 | 220 μm | 0.36 |
| 70 | 10.0 | 65.0 | 25.0 | V65 | 1.54 | 50.0 | — | — |

*1. The wt. %'s of DVB, Sty + EVB, TMPTMA, and initiator are all based upon the weight of polymerizable monomers.
2. The wt. % of isooctane is based upon the total weight of the organic phase - the weight of polymerizable monomers plus the weight of isooctane but not including the weight of initiator.
3. The polymerizations initiated by BPO were carried out at 72°-75° C. Those initiated with V65 were run at 52°-55° C.
4. The total polymerization times ranged from 20 to 26 hours.
5. The acronyms used mean the following:
DVP = divinylbenzene
Sty = styrene
EVB = ethylvinylbenzene
TMPTMA = trimethylolpropane trimethacrylate
BPO = benzoyl peroxide
V65 = 2,2'-azobis(2,4-dimethylpentane nitrile)

The low density polymer beads may be used in numerous applications. Low density polymer beads have numerous beneficial applications associated with the oil and gas industry, however, their applications are by no means limited to the drilling and completion of oil and gas wells. Generally, the low specific gravity polymer beads will have a specific gravity that is low enough to substantially lower the weight of a column of fluid, a slurry, a foam or any mixture which may remain liquid, which may be able to flow and change shape, or which may form a solid. The specific gravity of the polymer beads may be adjusted during the manufacturing process to achieve specific targets and then may be combined in specific quantities with the media to be lightened to achieve an overall target density.

In one application of the invention, low specific gravity beads may be mixed with a variety of cements to lower the weight of the overall volume without compromising the integrity of the resulting solid. In oil and gas well drilling and completion, for example, light weight cement is useful in reducing the pressure created by the column of the cement slurry at the formation level during pumping operations, while setting casing strings, thereby reducing the risk of fracturing lower pressured formations exposed to the column. Reducing the risk of fracturing lower pressure or producing formations is important since loss of cement into a fracture can create a poor casing bond with the formation and could possibly result in channeling of fluids behind the casing string and pressure anomalies on the casing string.

In another application of the invention, the low density polymer beads may be used to lighten a column of drilling fluid in dual gradient drilling. During conventional offshore drilling, operators may drill through a riser or large pipe, which extends from the sea floor up to the drilling rig on the surface of the ocean. In conventional drilling, the drilling fluid pressure gradient extends from the surface of the water or top of the drilling fluid column to the depth being drilled. In dual gradient drilling, the objective is to reduce the pressure gradient in the riser to hydrostatic, by injecting the low density polymer beads into the riser at the seafloor and recovering them at the surface from the drilling fluid system, and then re-injecting them. Further details of the recovery system may be found in U.S. Pat. No. 6,138,834, the entirety of which is hereby incorporated by reference. The objective is to more closely match the pore pressure and fracture gradients of the formations being drilled with the pressure gradient created by the drilling fluid system. The benefits achieved include (i) reducing the number of casing strings required to reach a given depth, (ii) reducing the risk of creating fractures in the formations being drilled and loosing returns and (iii) a reduction in the overall well cost to reach total depth of the well. Low density polymer beads are beneficial in that they are chemically inert and do not alter important mud properties, are incompressible, may be circulated with conventional mud pumps and they may be separated from the drilling fluid system and recirculated.

In yet another application of the invention, the low density polymer beads are used to free differentially stuck drill pipe. Drill strings can become differentially stuck when the hydrostatic pressure gradient exceeds the pore or formation pressure. When this occurs, the overburden pressure may become applied to the drill string, holding it against the lower pressured formation. While drilling with oil-based or synthetic drilling fluids, this differential sticking of the drill string may occur often. One practice to free this stuck pipe is to reduce the pressure gradient of the drilling fluid column to one that matches or is slightly less than the formation pressure. As the pressures equalize, the drill string becomes free. The low density polymer beads are used to lighten or reduce the pressure gradient of the drilling fluid column, allowing the drill string to become free. The drilling fluid is then circulated, the low-density polymer beads are separated from the mud system at the surface with a recovery unit, which is described in U.S. Pat. No. 6,138,834, and then drilling may continue.

In still another application of the invention, the low-density polymer beads may be mixed with syntactic or other types of foam and used for insulation and buoyancy in underwater applications. Such applications are beneficial when installing underwater pipelines where the foam occupies an annulus between the pipeline itself and an outer casing. The foam is a composite material consisting of the low density polymer beads embedded in a polymeric binder and is useful in many sub-sea applications to provide thermal insulation and/or buoyancy.

While the invention has been described in detail and with reference to specific embodiments thereof, it will be appar-

What we claim is:

1. A porous, spherical bead made by polymerization of reactants in the presence of isooctane, the reactants comprising:
   about 5-15 weight % divinylbenzene;
   about 60-90 weight % mixture of styrene and ethylvinylbenzene; and
   about 5-25 weight % trimethylolpropane trimethacrylate,
   wherein said bead comprising pores within the bead and a peripheral skin on the bead, wherein the peripheral skin prevents mass transport between the pores and media external to the bead; and
   wherein the bead has a specific gravity between about 0.2 and 0.9.

2. The porous, spherical bead of claim 1 wherein the reactants comprise about 50-60 weight % and the isooctane comprises about 40-50 weight % of an organic phase.

3. A porous, spherical bead made by polymerization of reactants in the presence of isooctane in an organic phase, the reactants being about 52 weight % and the isooctane being about 48 weight % of the organic phase, the reactants comprising:
   about 10 weight % divinylbenzene;
   about 77.2 weight % styrene;
   about 7.8 weight % ethylvinylbenzene; and
   about 5 weight % trimethylolpropane trimethacrylate,
   wherein said bead comprising pores within the bead and a peripheral skin on the bead, wherein the peripheral skin prevents mass transport between the pores and media external to the bead; and
   wherein the bead has a specific gravity between about 0.2 and 0.9.

4. A porous, spherical bead made by polymerization of reactants in the presence of isooctane in an organic phase, the reactants being about 50 weight % and the isooctane being about 50 weight % of the organic phase, the reactants comprising:
   about 8 weight % divinylbenzene;
   about 70.7 weight % styrene;
   about 6.3 weight % ethylvinylbenzene; and
   about 15 weight % trimethylolpropane trimethacrylate,
   wherein said bead comprising pores within the bead and a peripheral skin on the bead, wherein the peripheral skin prevents mass transport between the pores and media external to the bead; and
   wherein the bead has a specific gravity between about 0.2 and 0.9.

5. A porous, spherical bead comprising:
   a hydrophobic polyvinyl monomer;
   a hydrophilic polyvinyl monomer;
   at least one hydrophobic monovinyl monomer; and
   a hydrophobic porogen,
   wherein said bead comprising pores within the bead and a peripheral skin on the bead, wherein the peripheral skin prevents mass transport between the pores and media external to the bead, and
   wherein the bead has a specific gravity between about 0.2 and 0.9.

6. The porous, spherical bead of claim 5 wherein the hydrophobic polyvinyl monomer, the hydrophilic polyvinyl monomer, and the at least one hydrophobic monovinyl monomer are polymerized in the presence of the hydrophobic porogen and an initiator.

7. The porous, spherical bead of claim 5 wherein the hydrophobic polyvinyl monomer comprises a compound selected from the group consisting of divinylbenzene, trivinylbenzene, divinylnapthalene, trivinylcyclohexane, and combinations thereof; the hydrophilic polyvinyl monomer comprises a compound selected from the group consisting of trimethylolpropane trimethacrylate, trimethylolpropane dimethacrylate, trimethylolpropane triacrylate, trimethyolpropane diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol dimethacrylate, dipentaerythritol trimethacrylate, dipentaerythritol tetramethacrylate, dipentaerythritol pentamethacrylate, pentaerythritol trimethacrylate, pentaerythritol tetramethacrylate, and combinations thereof; the hydrophobic monovinyl monomer comprises a compound selected from the group consisting of styrene, ethylvinylbenzene, vinyltoluene, vinylnaphthalene, and combinations thereof; and the hydrophobic porogen comprises a compound selected from the group consisting of branched, cyclic, bicyclic, and tricyclic hydrocarbons and combinations thereof.

8. The porous, spherical bead of claim 5 further comprising an initiator selected from the group consisting of peroxyesters, diacyl peroxides, dialkyl peroxides, peroxydicarbonates, azobis(α-cyanoalkanes), and combinations thereof.

* * * * *